No. 839,999. PATENTED JAN. 1, 1907.
L. M. KELLOGG.
MOTIVE POWER ENGINE.
APPLICATION FILED AUG. 20, 1906.

Witnesses:
H. H. Hunt.
Ida M. Daskam.

Inventor:
Lewis. M. Kellogg.
By St. John Day.
Attorney.

UNITED STATES PATENT OFFICE.

LEWIS MARTIN KELLOGG, OF LOS ANGELES, CALIFORNIA.

MOTIVE-POWER ENGINE.

No. 839,999. Specification of Letters Patent. Patented Jan. 1, 1907.

Application filed August 20, 1906. Serial No. 331,369.

*To all whom it may concern:*

Be it known that I, LEWIS MARTIN KELLOGG, of the city of Los Angeles, in the county of Los Angeles and State of California, have invented a new or Improved Motive-Power Engine, of which the following is a full, clear, and exact description or specification, reference being had to the annexed drawings and to the letters marked thereon.

My said invention, which consists of a new or improved motive-power engine, is the result of experiments made by me to construct what is sometimes known as a "turbine-engine" which shall be economical in its use of the elastic fluid under a low pressure and having therefore but little expansion.

Figure 1:
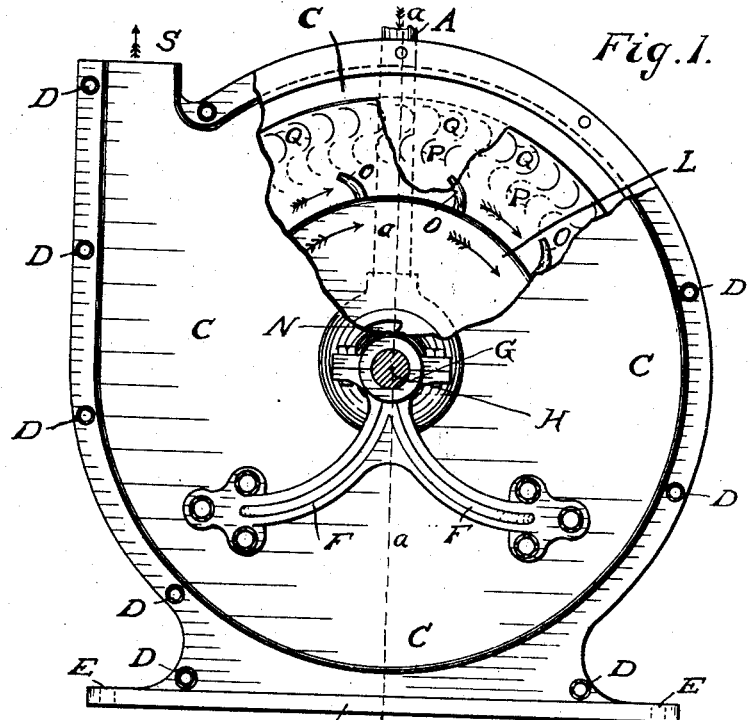
Figure 2:
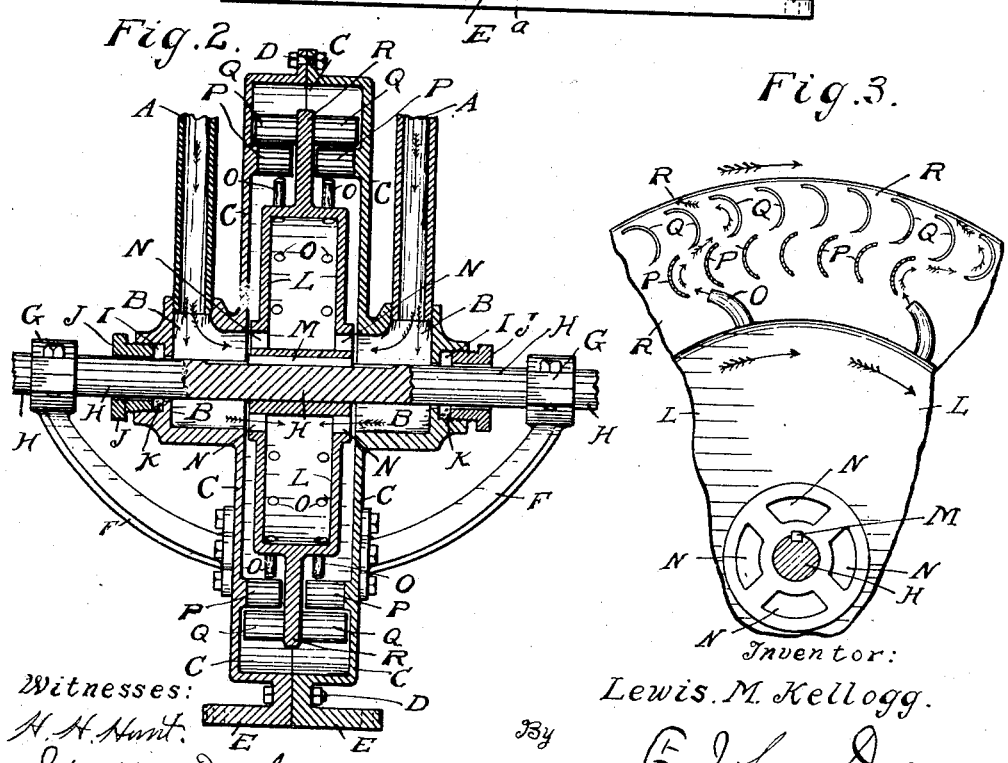
Figure 3:
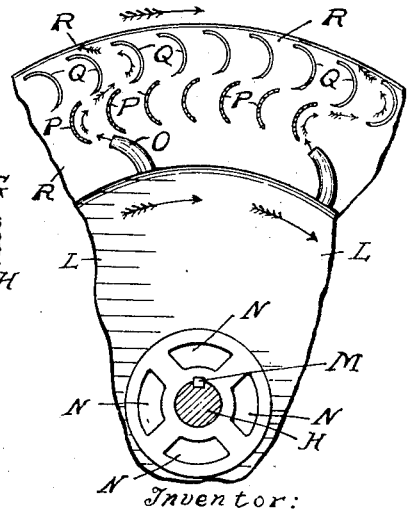

Upon the annexed drawings, Figure 1 is a side elevation of a turbine-engine shown partly in section and constructed in accordance with my present invention. Fig. 2 is a vertical section of my turbine-engine, taken upon the line *a a*, Fig. 1. Fig. 3 is an enlarged section of part of the rotator, sometimes called the "rotor," showing the admission-ports of the steam or other elastic fluid into the rotator and also some of the fixed vanes contained within the casing.

The low-pressure steam or other elastic fluid by which my turbine-engine is driven is taken into the engine through the pipes A A, Figs. 1 and 2. Each pipe A is screwed or otherwise fastened into a hollow receptacle or chamber B, forming the central exterior part of each half of the casing C. The halves of the casing C are held together by bolts D, as shown at Figs. 1 and 2, and the bottom of the casing is constructed as a foot or base E, whereby it is bolted or otherwise fastened down to a foundation, (not shown in the drawings, but which will be clearly understood.) To each half of the casing C a bracket-arm F is bolted, as shown at Figs. 1 and 2. At the upper and outer ends of the arms F F are the bearings G' G, respectively, wherein the driving-shaft H of the engine is carried so as to rotate in said bearings. The driving-shaft H passes through a stuffing-box I at the outer end of each chamber B of the casing C, and each stuffing-box I is fitted with a gland J for tightening the packing K, shown at the inner part of each stuffing-box I. The gland for tightening the packing in the stuffing-box I serves to make a sufficiently tight joint around the driving-shaft H and to prevent the escape out of the stuffing-box of the elastic fluid used for driving the engine.

Upon the central part of the shaft H the rotator or rotor L is carried, being fastened thereto by the key M. (Shown at Fig. 2.) The rotator consists of a hollow circular chamber L, whereinto low-pressure elastic fluid is admitted by the ports N N, Figs. 1, 2, and 3. At the outer part—that is to say, in the cylindrical exterior of the rotator L—a series of curved nozzles O are placed, and the elastic fluid as it flows from the admission-pipes A into the chambers B, thence into the hollow chamber of the rotator L, issues from each of the nozzles O, which, being curved, direct the issuance of the elastic fluid against and into the fixed curved vanes P, (shown in dotted lines in Fig. 1 and in full lines in Figs. 2 and 3,) each circle of vanes P P being carried by each half of the engine-casing C. As the elastic fluid issues from the nozzles O it strikes into the curved vanes P and recoils from the curved vanes P into the oppositely-curved vanes Q, projecting from each side of the annulus R of the rotator.

The arrows on the several figures of drawings show the direction of the passage of the elastic fluid through my turbine-engine and the escape of the exhaust fluid through or by the exhaust or discharge opening S, Fig. 1, also the direction of rotation of the revolving parts of the engine.

It will be understood from the preceding parts of this specification and from the annexed drawings that by reason of the elastic fluid for driving the rotative parts of the engine being admitted at opposite sides of the rotator the rotator is maintained in equilibrium of pressure of the elastic fluid, while it also results that because of the rotating parts of the engine being thus maintained in equilibrium there is no friction engendered by the operative faces of the rotator being pressed against any adjacent part of the casing, such as would be the case if the elastic fluid were admitted into the chamber and rotator at one side only of the casing.

Having now described my said invention, what I consider to be novel and original, and therefore claim as the invention to be secured to me by Letters Patent, is as follows:

1. The motive-power engine consisting of a hollow rotator carried upon a driving-shaft at the center of a fixed casing, the admission-ports at each side of the center of the cylindrical casing and at each side of the center of the rotator, for admitting the elastic fluid at both sides of the engine into the casing and into the rotator, the fixed curved nozzles of the rotator, the curved vanes at the outer part of the annulus of the rotator, the fixed vanes in the casing forming a ring of curved impact-surfaces between the nozzles and curved vanes of the rotator, the vanes fixed in the casing being curved toward the discharge-orifices of the nozzles and the vanes on the annulus of the rotator being curved oppositely to the curvature of the fixed vanes, the exhaust-passage, the whole constituting my improved motive-power engine, and operating substantially as described.

2. The combination consisting of the circular stationary casing, the admission-ports at the center of said casing, the stuffing-boxes and glands at the outer parts of the chambers constituting the admission-ports of the casing, the driving-shaft rotating in said stuffing-boxes, the rotator having admission-ports at the center of the circular chamber, the circular chamber, the curved nozzles in the circular chamber, the annulus at the exterior of the circular chamber, the curved vanes carried by said annulus, the fixed curved vanes carried by the casing, the exhaust or discharge port, the whole constituting my new or improved motive-power engine, and operating substantially as set forth.

In testimony whereof I have hereunto set my hand and seal, at the city of Los Angeles aforesaid, in the presence of two subscribing witnesses.

LEWIS MARTIN KELLOGG. [L. S.]

Witnesses:
 ST. JOHN DAY,
 IDA M. DASKAM.